United States Patent
Tseng et al.

(10) Patent No.: US 7,529,797 B2
(45) Date of Patent: May 5, 2009

(54) USER CREATED TAGS FOR ONLINE SOCIAL NETWORKING

(75) Inventors: Greg Tseng, Los Altos Hills, CA (US); Johann Schleier-Smith, Los Altos Hills, CA (US)

(73) Assignee: Tagged, Inc., San Francisco, CA (US)

( * ) Notice: Subject to any disclaimer, the term of this patent is extended or adjusted under 35 U.S.C. 154(b) by 0 days.

(21) Appl. No.: 11/829,719

(22) Filed: Jul. 27, 2007

(65) Prior Publication Data

US 2008/0046458 A1 Feb. 21, 2008

Related U.S. Application Data

(60) Provisional application No. 60/838,459, filed on Aug. 16, 2006.

(51) Int. Cl.
*G06F 15/16* (2006.01)

(52) U.S. Cl. .................. 709/204; 709/201; 709/205; 709/217; 709/218; 709/219; 709/223; 709/226

(58) Field of Classification Search ................ 709/201, 709/204, 205, 217, 218, 219, 223, 226
See application file for complete search history.

(56) References Cited

U.S. PATENT DOCUMENTS

| | | | | |
|---|---|---|---|---|
| 6,112,181 A | * | 8/2000 | Shear et al. ................ 705/1 |
| 7,069,308 B2 | * | 6/2006 | Abrams ................... 709/218 |
| 7,117,254 B2 | * | 10/2006 | Lunt et al. ............... 709/218 |
| 7,149,977 B2 | * | 12/2006 | Zaner et al. .............. 715/753 |
| 7,234,117 B2 | * | 6/2007 | Zaner et al. .............. 715/758 |
| 7,249,123 B2 | * | 7/2007 | Elder et al. ................. 707/3 |
| 7,269,590 B2 | * | 9/2007 | Hull et al. ................. 707/10 |
| 7,359,894 B1 | * | 4/2008 | Liebman et al. ............ 707/3 |
| 7,366,759 B2 | * | 4/2008 | Trevithick et al. ......... 709/206 |
| 7,373,606 B2 | * | 5/2008 | Gorzela ................... 715/738 |
| 7,433,876 B2 | * | 10/2008 | Spivack et al. ............ 707/100 |
| 2005/0021750 A1 | * | 1/2005 | Abrams ................... 709/225 |
| 2005/0235062 A1 | * | 10/2005 | Lunt et al. ............... 709/225 |
| 2006/0242554 A1 | * | 10/2006 | Gerace et al. ........... 715/501.1 |
| 2006/0282328 A1 | * | 12/2006 | Gerace et al. .............. 705/14 |
| 2007/0282877 A1 | * | 12/2007 | Fischer et al. ............ 707/101 |

* cited by examiner

*Primary Examiner*—Liangche A Wang
(74) *Attorney, Agent, or Firm*—Perkins Coie LLP

(57) ABSTRACT

The present invention provides a social networking system and method by which customized tags can be created by a registered user in an online social networking environment and distributed to facilitate social networking. The tags represent personal characteristics and preferences associated with users of the online social networking environment. A graphical user interface (GUI) is provided in the online social networking website that enables a specific user to create and customize tags. Tags can be embeddable in that a user can insert the tag in a website GUI for display. Also, tags may have embedded content, e.g. a photo, a song, a profile page location, etc and may be sponsored or traded in the social networking website. Also a skin that shows the personal profile page GUI style may be customized, sponsored, or traded.

15 Claims, 10 Drawing Sheets

Figure 8

USER CREATED TAGS FOR ONLINE SOCIAL NETWORKING

RELATED APPLICATIONS

This application claims priority to U.S. Provisional Patent Application No. 60/838,459, filed Aug. 16, 2006, and entitled "User Created Tags For Online Social Networking," by Greg Tseng et al., and is hereby incorporated herein by reference.

FIELD OF THE INVENTION

The present invention relates to online social networking, and facilitates online social networking via tagging schemes and tags that represent personal characteristics and preferences.

BACKGROUND OF THE INVENTION

The Internet has spawned a host of busy social networking platforms. The typical online social networking website graphic user interface (GUI) lacked the sophistication to convey personal characteristics in a movable fashion. The typical social networking website GUI has a personal profile page with personal information and interests of a user, and is used to browse the social network member's information and contacts. Another user can initiate communication by leaving messages or comments.

SUMMARY OF THE INVENTION

The invention includes a social networking method for creating customized tags. The method provides an online social networking environment that supports tags representing personal characteristics and preferences associated with users of the online social networking environment. A user can open a GUI that enables the user to create and customize tags.

An embodiment of the present invention teaches an Internet website user interface that allows a registered user to choose between predefined tags or create customized tags. Once a user chooses to create customized tags, the application allows a user to select a name and create a graphic icon by uploading, linking to a URL, using a template, or drawing. After the tag is created, the user can store the tag data.

A tag can be embeddable in that a user can insert the embeddable tag in a website GUI for display, including other social networking websites. Also, a user can embed in tags desired contents, e.g. a photo, a song, a location (profile page), a shout-out, an expression of feeling, tags, presents, etc. The recipient can click the embedded tags to see the photo, play the song, go to the profile page, or chat, etc.

To facilitate advertising in an online social networking environment and provide sponsorship of the online social networking, sponsored tags may be used by users or sponsors of a social network website. Sponsored tags represent a product, a brand, a trademark, or a generic icon of a sponsor.

To facilitate the management of the online social network, a buddy list or tag team list as well as external distribution list may be used for the purpose of socialization, contact, or distribution of tags.

A user of the online social network may use a tag Container that conveniently stores and displays the users tags, which are created, selected, or received by the user. Tag trading statistics of each user may be stored for history tracking.

To provide a customized profile page of a user in the online social networking website, a customized skin that shows personal style of the profile page may be also created, sponsored or traded in the social networking environment.

BRIEF DESCRIPTION OF THE DRAWINGS

Non-limiting and non-exhaustive embodiments of the present invention are described with reference to the following drawings, in which:

FIG. 8 is a representative GUI displaying predefined tags available to send to another registered user.

DETAILED DESCRIPTION OF THE INVENTION

Figure 1:
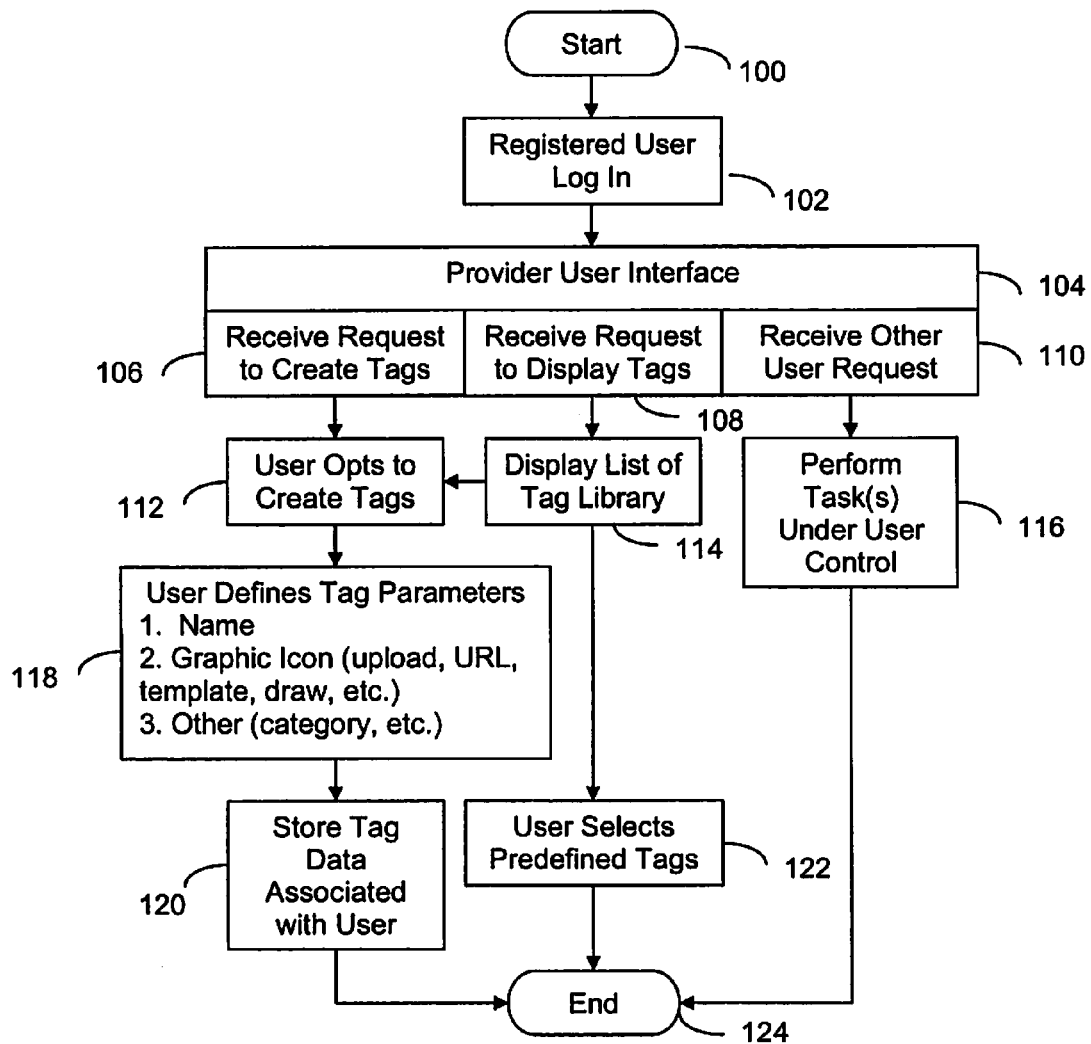
FIG. 1 is a representative method flowchart featuring the steps of creating user defined tags.

An invention is disclosed for a system and method for creating customized tags that represent personal characteristics and preferences, by users of a social network website, to facilitate online social networking. In the following description, numerous specific details are set forth in order to provide a thorough understanding of the present invention. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Briefly stated, an embodiment of the invention is related to a social networking system and method by which customized tags can be created by a registered user in an online social networking environment and distributed to facilitate social networking. The tags represent personal characteristics and preferences associated with users of the online social networking environment. By utilizing a computer or graphic user interface (GUI) that enables a specific user to create and customize tags, the user can create a specific tag according to instructions from the specific user and make the specific tag available for use by the specific user. The steps of allowing the user to create the customized tags may include defining the tag parameters, e.g. a name, a graphic icon, and a category, etc.

The website www.tagged.com provides an interactive social experience for teens. It's a place to meet new people, let people know what a person is all about, and make new friends. Once a person registers, he can fill out his profile and invite all of his friends to join his tag Team. The user can continue to add people to his team, see who's in other people's tag teams, and check out other people's profiles by clicking on their names.

Tags represent who the user is. For example, if the user is a great athlete, she can select a Sports tag, or if a dancer or a writer, select the Arts tag. A user can give her friends tags (like "Best Friend," etc.) to let them know what she thinks about them. If the user wants to nudge his friends to give him tags, he can ask them by going to his tag Team page and clicking the hand icon next to each person on his team to ask for tags.

Tags can be created by the user via the provider's user interface by defining various tag parameters, e.g. name, graphic icon, etc. This invention discloses a system and method for creating customized tags that represents personal characteristics and preferences, by users of a social network website, to facilitate online social networking, as well as advertisement method in the online social networking environment by using sponsored tags.

Tags can be embeddable in that they could be inserted in a website GUI for display by a user. Also, tags may have embedded contents, e.g. a photo, a song, a location of a profile page, a shout out, an expression of feelings, tags, or presents. Also, tags can be traded or sponsored in the social networking environment by users of the social network, the creators of tags, and sponsors.

FIG. 1 is a representative method flowchart featuring the steps of creating user defined tags. A registered user of an online social network can Log In 102, and choose one of the options available from the online social networking provider's GUI 104. In one embodiment, the user can request to create tags 106, or request to display predefined tags 108, or request other tasks 110. After the user opts to create customized tags 112, a provider GUI enables the user to create customized tags by defining the tag parameters 118, e.g. a name, a graphic icon, a category, etc. Once the customized tags are defined, the tag data can be stored and associated with the creator (user) 120 for future use. If the user instead chooses to display the list of tag library 114, the provider GUI shows predefined tags for the user to browse. The user can select tags among the predefined tags displayed 122, or opt to create customized tags 112 if he does not want to use the predefined tags. If the user has chosen to request other tasks 110 from the provider GUI 104, he can perform the tasks 116 and end the session 124.

Figure 2:
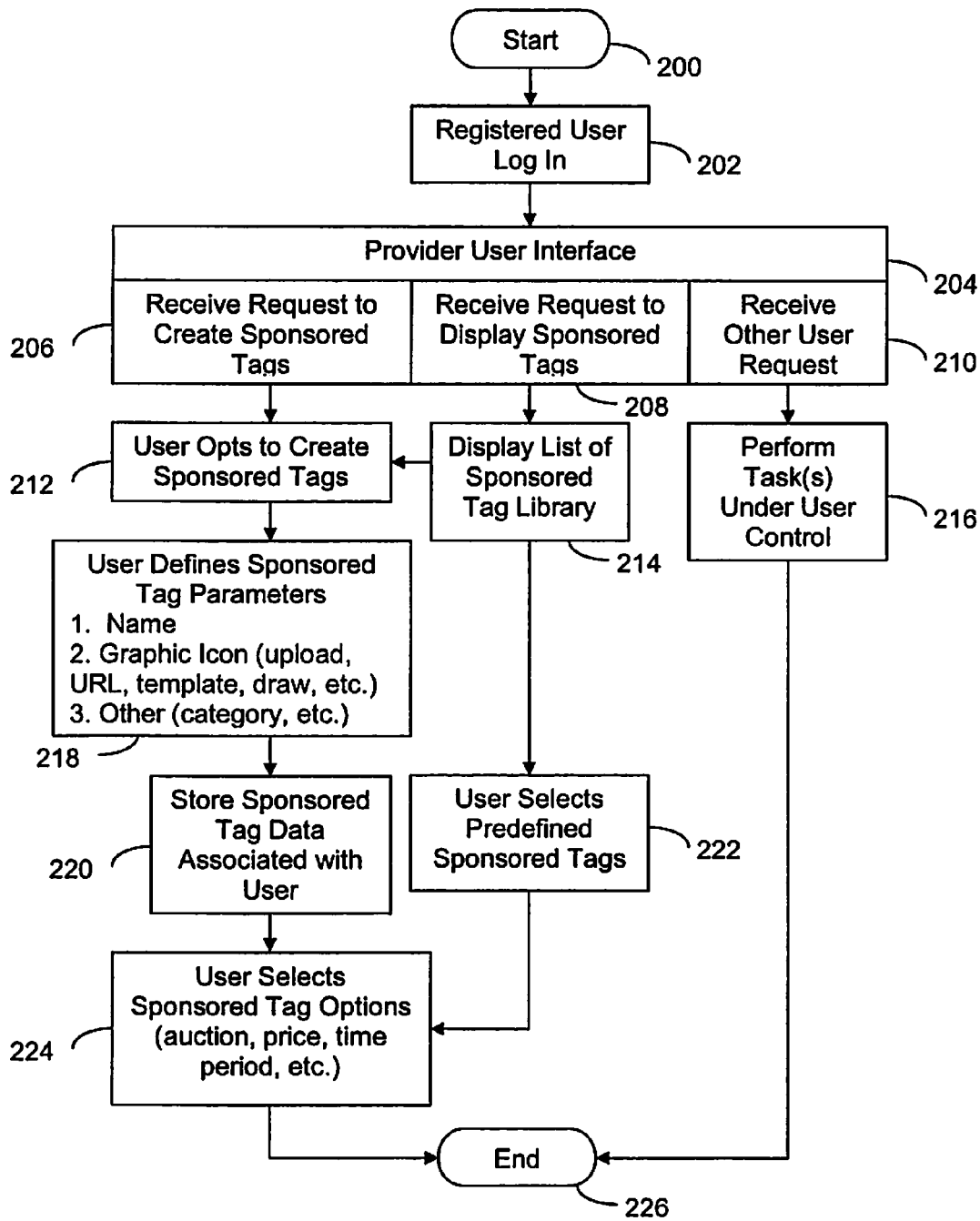
FIG. 2 is a representative method flowchart featuring the steps of creating sponsored tags.

FIG. 2 is a representative method flowchart featuring the steps of creating sponsored tags. A registered user of an online social network can Log In 202, and choose one of the options available from the online social networking provider's GUI 204. In one embodiment, the user can request to create customized sponsored tags 206, or request to display predefined sponsored tags 208, or request other tasks 210. After the user opts to create customized sponsored tags 212, a provider GUI enables the user to create sponsored tags by defining the tag parameters 218, e.g. a name, a graphic icon, a category, etc. Once the sponsored tags are defined, the sponsored tag data can be stored and associated with the creator (user) 220 for future use. After the tag data is stored, the user can select sponsored tag options, e.g. auction, price, time period, etc 224. If the user instead chooses to display the list of sponsored tag library 214, the provider GUI shows predefined sponsored tags for the user to browse. The user can select sponsored tags among the predefined sponsored tags displayed 222, or opt to create customized sponsored tags 212 if he does not want to use the predefined sponsored tags. If the user select predefined sponsored tags 222, he can select the sponsored tag options, e.g. auction, price, time period, etc. 224. If the user has chosen to request other tasks 210 from the provider GUI 204, he can perform the tasks 216 and end the session 226.

Figure 3:
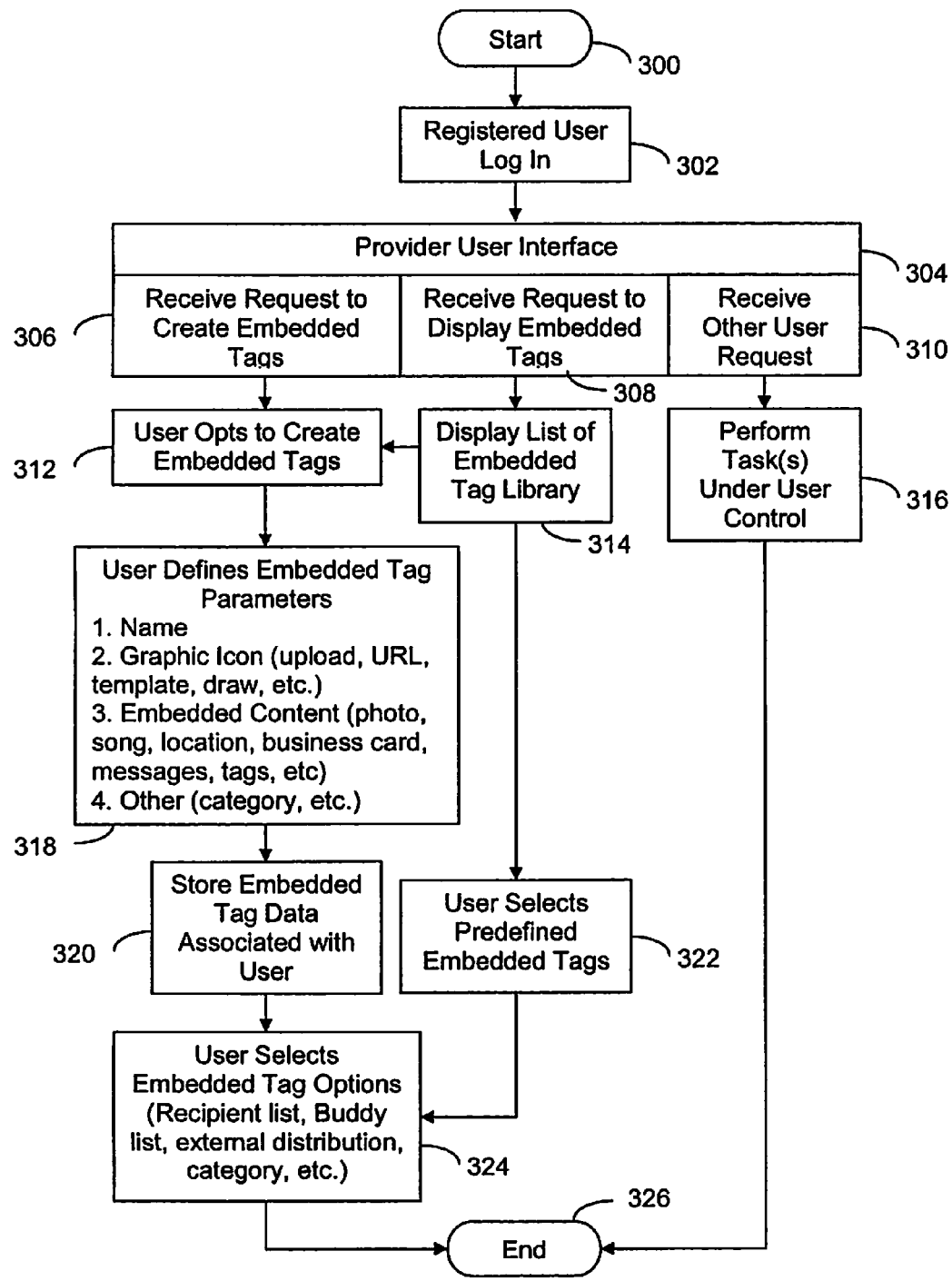
FIG. 3 is a representative method flowchart featuring the steps of creating embedded tags.

FIG. 3 is a representative method flowchart featuring the steps of creating embedded tags. A registered user of an online social network can Log In 302, and choose one of the options available from the online social networking provider's GUI 304. In one embodiment, the user can request to create embedded tags 306, or request to display predefined embedded tags 308, or request other tasks 310. After the user opts to create customized embedded tags 312, a provider GUI enables the user to create customized embedded tags by defining the tag parameters 318, e.g. a name, a graphic icon, embedded content, a category, etc. Once the customized embedded tags are defined, the tag data can be associated with the creator (user) 320 for future use. After the tag data is stored, the user can select embedded tag options, e.g. recipient list, buddy list, external distribution, a category, etc 324. If the user instead chooses to display the list of embedded tag library 314, the provider GUI shows predefined embedded tags for the user to browse. The user can select embedded tags among the predefined embedded tags displayed 322, or opt to create customized embedded tags 312 if he does not want to use the predefined tags. If the user select predefined embedded tags 322, he can select the embedded tag options, e.g. recipient list, buddy list, external distribution, a category, etc 324. If the user has chosen to request other tasks 310 from the provider GUI 304, he can perform the tasks 316 and end the session 324.

Figure 4:
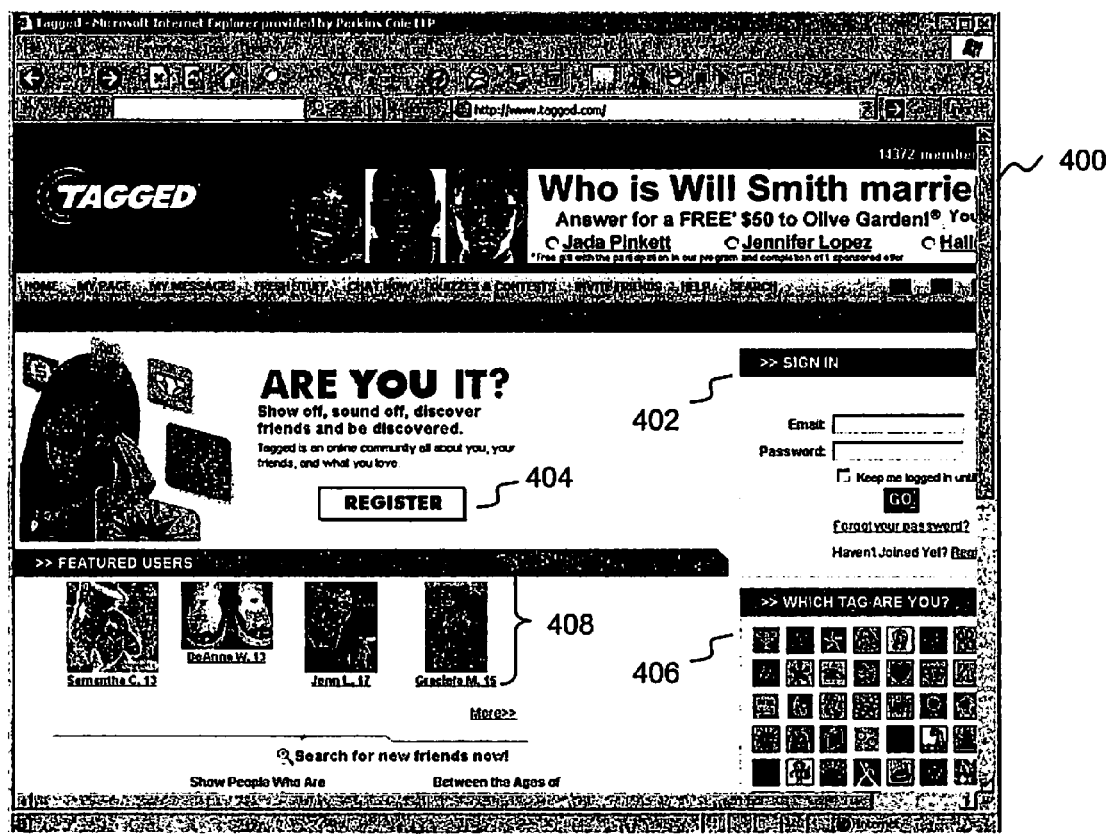
FIG. 4 is a representative graphic user interface (GUI) that allows a registered user to log in or a new user to register in the social networking website.

FIG. 4 illustrates a representative provider GUI 400 of the online social networking website that allows a registered user to Sign In (or Log In) 402 or a new user to register 404 in the social networking website. Also it shows sample tags that are available on the website 406. In one embodiment, a registered user can type in the email address and password in the Sign In box 402 to log in. The GUI 400 also shows Featured Users 408 with a photo and user name with age, to facilitate social networking with them.

Figure 5:
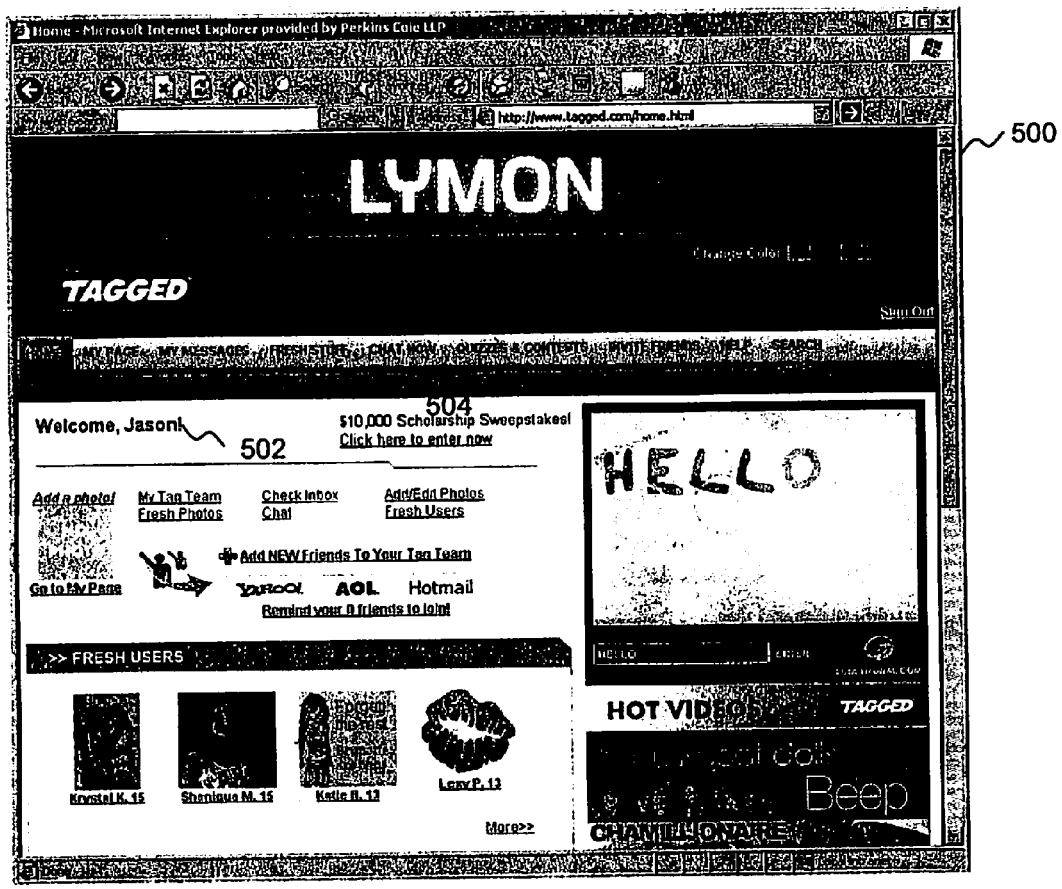
FIG. 5 is a representative GUI after a registered user has logged in to provide a starting point to utilize the social networking website's featured functions.

FIG. 5 is a representative GUI 500 of the online social networking website, after a registered user 502 has logged in. GUI 500 provides a starting point to utilize the social networking website's featured functions, including the menu bar 504. The user 502 can, for example, Invite Friends, Search registered users to socialize with, or get involved other social activities (chat, quizzes, contests, etc).

Figure 6:
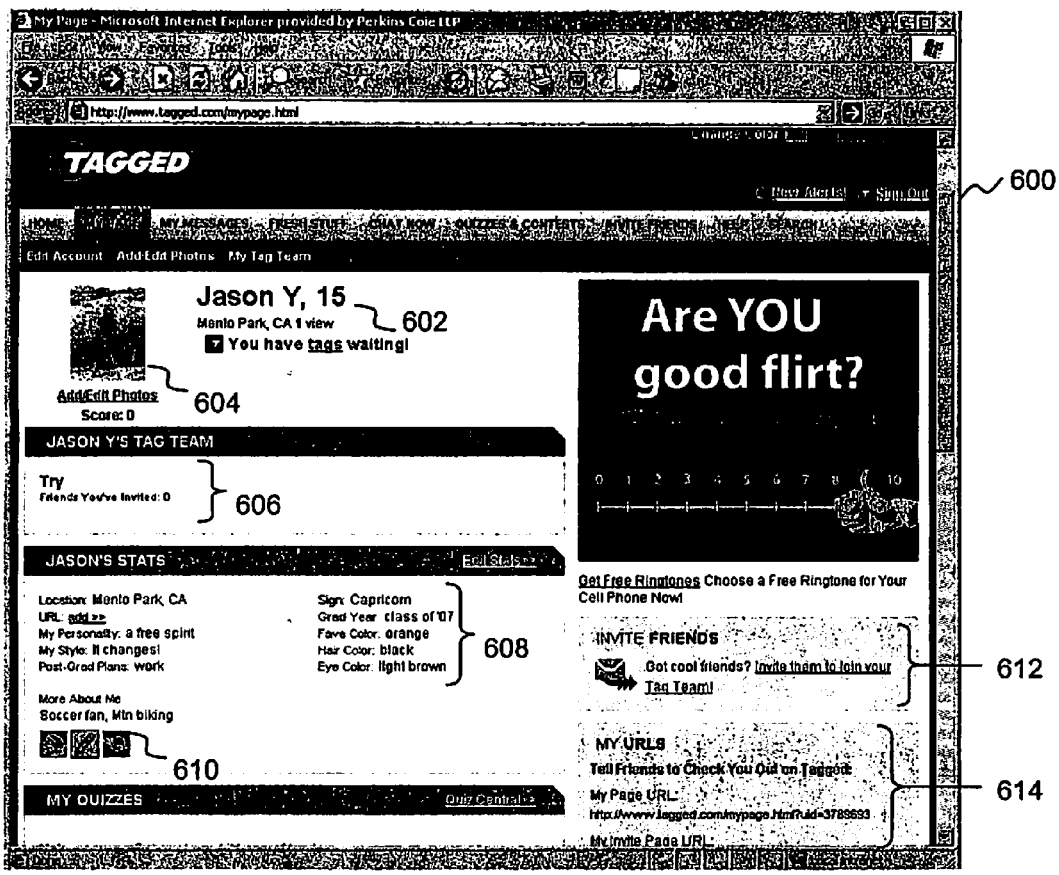
FIG. 6 is a representative GUI of a registered user's profile page, which enables the user to work with tags, invite friends, create teams, and other social networking tasks.

FIG. 6 illustrates a GUI 600 provided to a user 602. The social networking GUI 600 is a representative of a users profile page that enables the user 602 to work with tags, invite friends, create teams, and accomplish other social networking tasks as will be appreciated by those skilled in the art. The GUI 600 includes a statistics window 604 that allows the user to review and edit personal statistics. The GUI 600 may also include the users photos 606. The tag 606 represents personal characteristics and preferences. The GUI 600 further includes a tag team window 608, a 'friends' management window 610, and a URL management window 612. The personal profile page GUI 600 may be customized to show personal style, and also traded or sponsored in the social networking environment.

Figure 7:
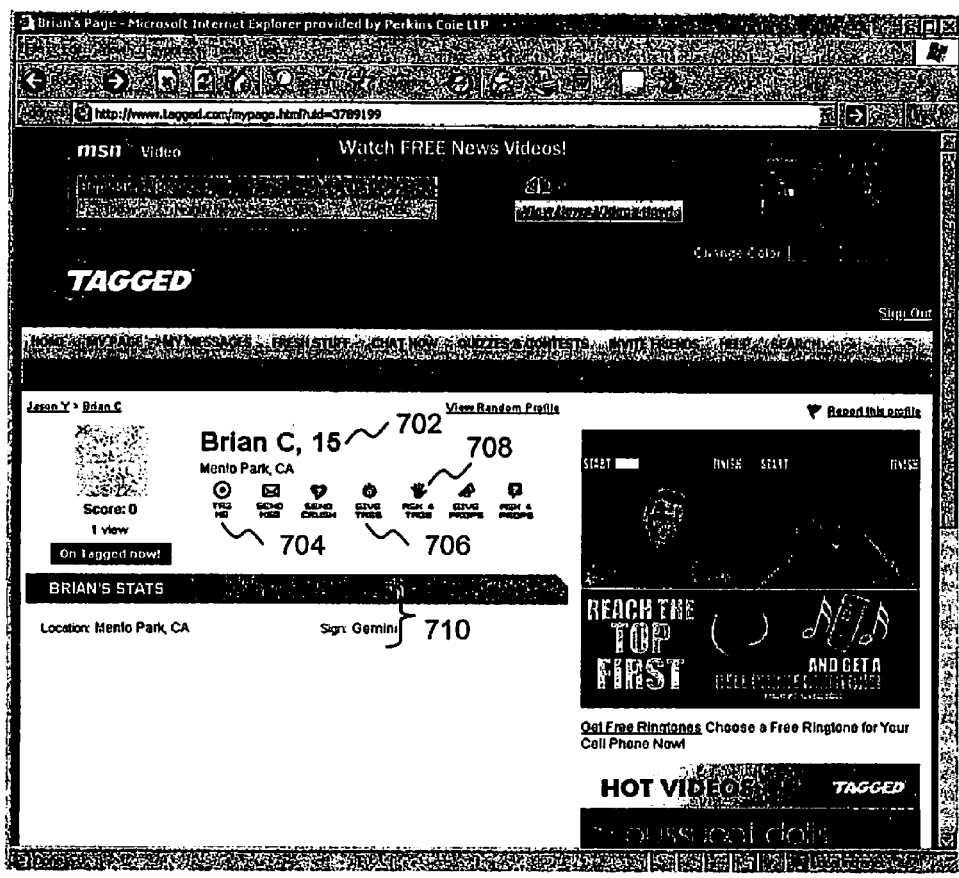
FIG. 7 is a representative GUI of another registered user's page where a user can invite to his team and send or request tags.

FIG. 7 is a representative GUI 700 of another registered user's page that can be reached by searching the registered user data base and choosing the person's page. A user can invite the person 702 to his team by tagging him 704, give tags 706, or ask for tags 708. The page also shows the person's statistics 710.

Figure 8:
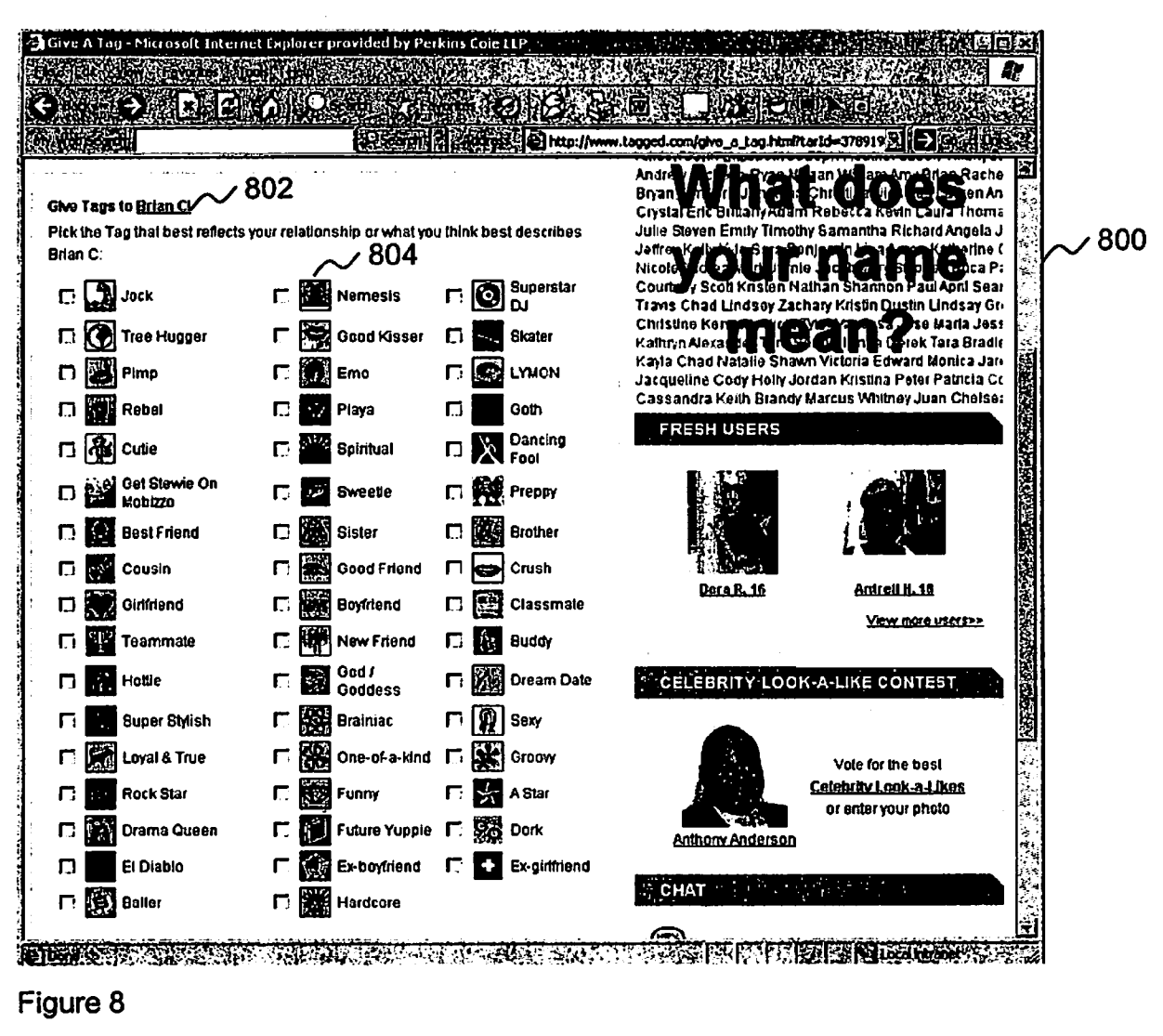

FIG. 8 is a representative GUI 800 displaying predefined tags 804 available to send to another registered user 802. The person sending tags can select as many tags as wished from the available tags 804 that best reflect the relationship or what the sender think best describes the recipient.

Figure 9:
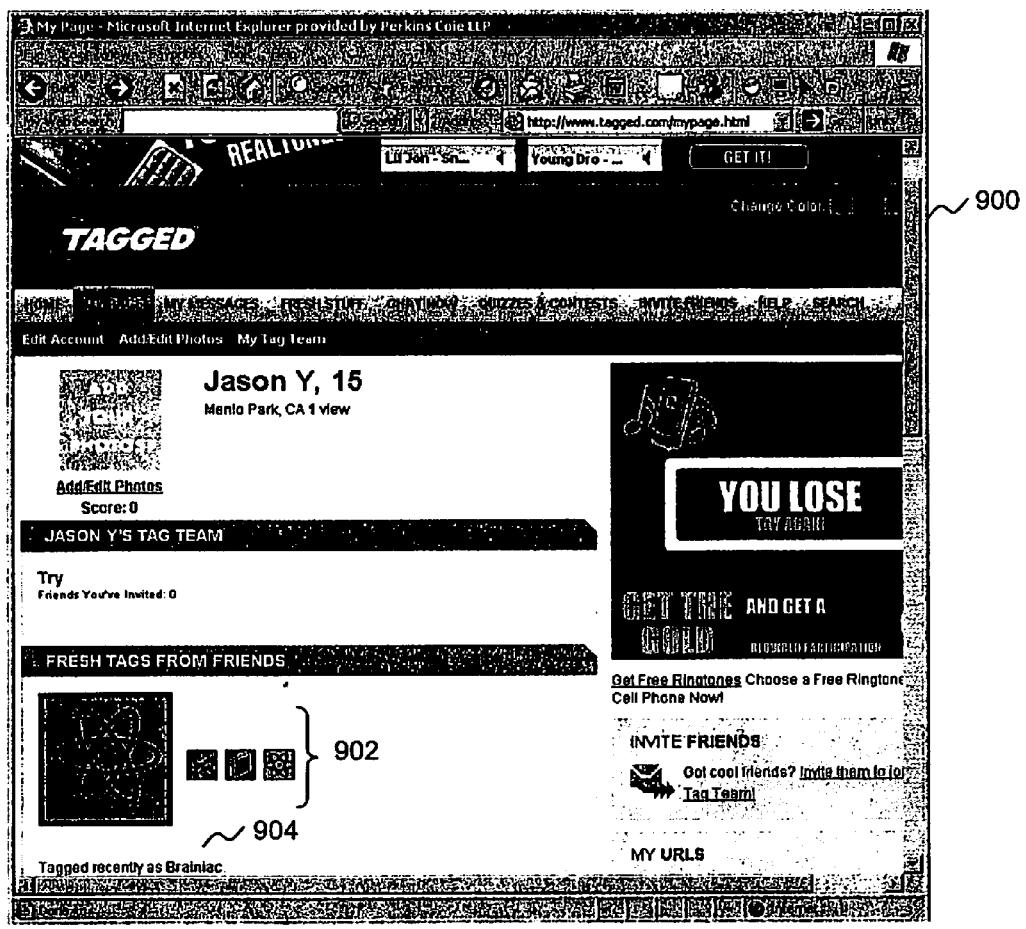
FIG. 9 is a representative GUI showing a registered user's "My Page" with tags received from another user.

FIG. 9 illustrates a representative GUI 900 showing a registered user's page after the user received tags 902 from another user 904.

Figure 10:
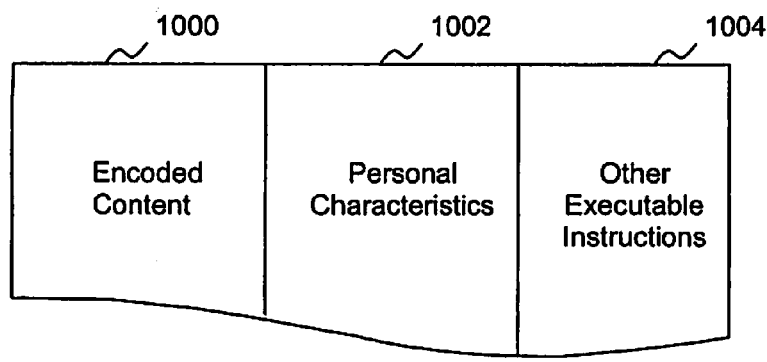
FIG. 10 is a representative structure of an embeddable tag.

FIG. 10 is the representative structure of embeddable tag, including encoded content 1000, personal characteristics 1002, and other executable instructions 1004.

Figure 11:
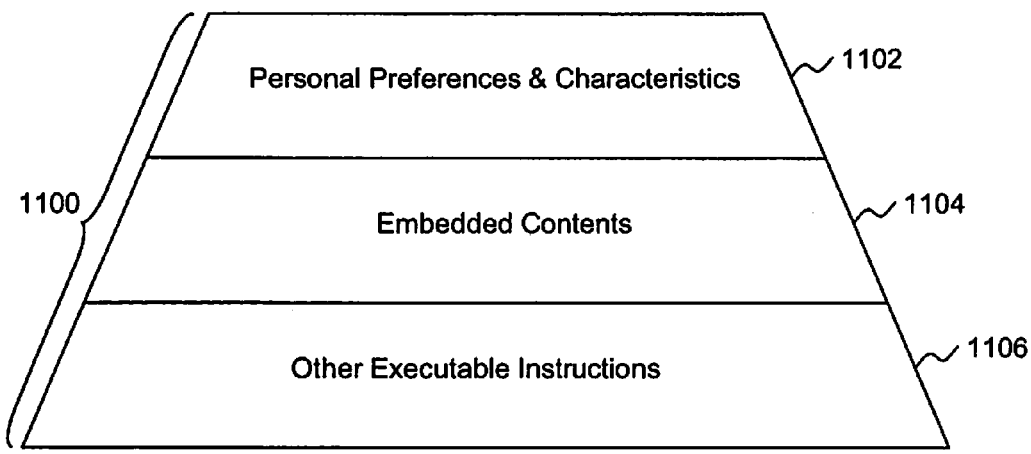
FIG. 11 is a representative structure of an embedded tag.

FIG. 11 shows a representative embedded tag structure 1100. An embedded tag represents personal preferences and characteristics 1102 e.g. by texts, a graphical icon, etc. Also, a tag can have embedded contents 1104, e.g. a photo, a song, a location of a profile page, a shout out, an expression of feelings, tags, or presents, etc. Other executable instructions 1106, e.g. to see the photo, play the song, go to the profile page, play a movie, or chat, etc. can be carried by a tag. A tag may be customized, traded, or sponsored in the social networking environment.

Figure 12:
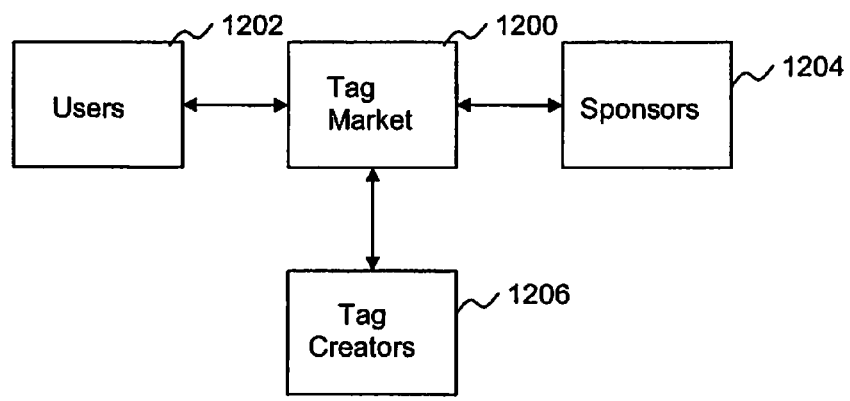
FIG. 12 is a representative interaction diagram for a tag market.

FIG. 12 illustrates the representative interaction of a tag market 1200. The users of the online social networking website 1202, creators of customized tags 1206, and sponsors 1204 interact in the tag market 1200 to buy, sell, or exchange tags.

What is claimed is:

1. A computer network for a social networking environment:
   a communications network;
   a plurality of client devices, said client devices providing a graphical user interface for social networking to a plurality of social networkers;
   a database including information about said plurality of social networkers, wherein the graphical user interface enables a first social networker of said plurality of social networkers to:
      create a first tag describing a second social networker of said plurality of social networkers, wherein said first tag represents a trait of said second social networker as attributed by said first social networker;
      convey said first tag to said second social networker to enable said second social networker to add said first tag to said second social networker's tag collection; and
   executable for embedding said first tag into said social networking environment by bringing said first tag into said graphical user interface through an image related to said attributed trait.

2. The computer network of claim 1, wherein a customized skin that shows customized personal profile page style is traded or sponsored.

3. The computer network of claim 1, wherein tags are traded among said plurality of social networkers, tag creators, sponsors.

4. The computer network of claim 1, wherein a buddy list, a tag team list, or an external distribution list is used for the purpose of socialization, contact, or distribution of tags.

5. The computer network of claim 1, wherein a tag Container is used in the online social networking environment that conveniently stores and displays a specific social networker's tags, which are created, selected, or received by said specific social networker.

6. A social networking method for creating customized tags, the method comprising:
   establishing an online social networking environment that supports tags;
   operating a user interface that enables a first user of the social networking environment to:
      create a first tag describing a second user of the online social networking environment, wherein the first tag represents a trait of the second user as attributed by the first user; and
      convey the first tag to the second user to enable the second user to add the first tag to the second user's tag collection; and
   displaying the first tag in a profile page associated with the second user subsequent to the second user accepting the first tag conveyed by the first user.

7. The method of claim 6, wherein the first user creating the first tag provides using the user interface a name for the first tag, and a graphic icon to be associated with the first tag.

8. The method of claim 7, wherein the graphic icon is generated by uploading, linking to a universal resource locator, using a template, or drawing.

9. The method of claim 6, wherein the user interface enables the first user to create the first tag by allowing the first user to select a specific tag from a repository of pre-established tags offered by the online social networking environment.

10. The method of claim 6, wherein the user interface enables the first user to create the first tag by allowing the first user to configure a tailored tag using a tag creation tool.

11. The method of claim 10, wherein the online social networking environment stores the tailored tag in association with the first user, enabling the first user to optionally reuse the tailored tag to describe a third user of the online social networking environment.

12. An advertising method in online social networking environment using sponsored tags, the method comprising:
   establishing an online social networking environment that supports sponsored tags;
   operating a graphical user interface that enables a sponsor to create and customize a plurality of sponsored tags, wherein each of the plurality of sponsored tags represents a product, a brand, a trademark, or an icon associated with the sponsor, without indicating personal information of users associated with the online social networking environment, further wherein the graphical user interface enables a first user of the online social networking environment to:
      select a first sponsored tag from the plurality of sponsored tags to describe a second user of the online social networking environment;
      convey the first sponsored tag to the second user to enable the second user to add the first sponsored tag to the second user's tag collection; and
   displaying the first tag in a profile page associated with the second user subsequent to the second user accepting the first sponsored tag conveyed by the first user.

13. The method of claim 12, the sponsored tag having contents, the contents including sound, universal resource locator, descriptive page, web application, or phone calls.

14. The method of claim 12, wherein the use of sponsored tags in the online social networking environment includes selling, limited distribution, and auctioning the sponsored tag.

15. The method of claim 14, wherein, in addition to a graphic image representing the first tag, the first tag further includes a embedded content that can be accessed by a third user of the online social networking environment.

* * * * *